(12) United States Patent
Han et al.

(10) Patent No.: US 9,263,778 B2
(45) Date of Patent: Feb. 16, 2016

(54) ELECTRIC VEHICLE RUNNING CONTROL SYSTEM

(71) Applicants: Shenzhen BYD Auto R&D Company Limited, Shenzhen (CN); BYD Company Limited, Shenzhen (CN)

(72) Inventors: Yaochuan Han, Shenzhen (CN); Wei Feng, Shenzhen (CN); Qinyao Yang, Shenzhen (CN); Xianyin Li, Shenzhen (CN)

(73) Assignees: SHENZHEN BYD AUTO R&D COMPANY LIMITED, Shenzhen (CN); BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/335,831

(22) Filed: Jul. 18, 2014

(65) Prior Publication Data

US 2014/0329113 A1 Nov. 6, 2014

Related U.S. Application Data

(63) Continuation of application No. PCT/CN2013/070644, filed on Jan. 18, 2013.

(51) Int. Cl.
*H05B 1/02* (2006.01)
*H01M 10/657* (2014.01)
(Continued)

(52) U.S. Cl.
CPC .............. *H01M 10/5081* (2013.01); *B60L 1/02* (2013.01); *B60L 11/005* (2013.01); *B60L 11/1875* (2013.01); *H01M 10/4264* (2013.01); *H01M 10/615* (2015.04); *H01M 10/657* (2015.04); *H01M 16/00* (2013.01); *H05B 1/0236* (2013.01);
(Continued)

(58) Field of Classification Search
CPC .......... H01M 10/5081; H01M 10/515; H01M 10/657; B60L 1/02; B60L 11/005; H05B 1/0236; H05B 3/0042
USPC .......... 219/400, 497, 501, 503, 202, 203, 490
See application file for complete search history.

(56) References Cited

U.S. PATENT DOCUMENTS

| | | | | |
|---|---|---|---|---|
| 5,334,988 A | * | 8/1994 | Murakami et al. | 343/704 |
| 5,852,284 A | * | 12/1998 | Teder et al. | 219/522 |
| 6,130,645 A | * | 10/2000 | Lindenmeier et al. | 343/704 |
| 6,340,879 B1 | | 1/2002 | Blacker | |

(Continued)

FOREIGN PATENT DOCUMENTS

| CN | 201667552 U | 12/2010 |
|---|---|---|
| CN | 102074752 A | 5/2011 |

(Continued)

OTHER PUBLICATIONS

WIPO Application No. PCT/CN2013/070644, PCT International Search Report and Written Opinion of the International Searching Authority mailed Apr. 25, 2013.

*Primary Examiner* — Mark Paschall
(74) *Attorney, Agent, or Firm* — Alston & Bird LLP

(57) ABSTRACT

An electric vehicle running control system is provided. The electric vehicle running control system comprises a heating circuit coupled with an in-vehicle battery and configured to heat the in-vehicle battery. The vehicle running control system further comprises a load capacitor and a first current storage element. The first current storage element may be coupled with the load capacitor and the heating circuit respectively configured to reduce interference between the heating circuit and the load capacitor.

19 Claims, 10 Drawing Sheets

(51) Int. Cl.
  *B60L 1/02* (2006.01)
  *B60L 11/00* (2006.01)
  *B60L 11/18* (2006.01)
  *H01M 16/00* (2006.01)
  *H01M 10/42* (2006.01)
  *H01M 10/615* (2014.01)

(52) U.S. Cl.
  CPC ........ *B60L 2210/30* (2013.01); *B60L 2240/545* (2013.01); *B60L 2240/547* (2013.01); *B60L 2240/549* (2013.01); *H01M 2010/4271* (2013.01); *H01M 2220/20* (2013.01); *Y02T 10/7005* (2013.01); *Y02T 10/705* (2013.01); *Y02T 10/7022* (2013.01); *Y02T 10/7241* (2013.01)

(56) References Cited

U.S. PATENT DOCUMENTS

| | | | |
|---|---|---|---|
| 6,888,508 B2 * | 5/2005 | Lindenmeier | 343/713 |
| 2007/0194009 A1 * | 8/2007 | Seger | 219/600 |
| 2012/0025756 A1 | 2/2012 | Xu et al. | |
| 2012/0161711 A1 | 6/2012 | Xu et al. | |

FOREIGN PATENT DOCUMENTS

| | | |
|---|---|---|
| CN | 102074754 A | 5/2011 |
| CN | 102082306 A | 6/2011 |
| CN | 201994390 U | 9/2011 |
| CN | 202111197 U | 1/2012 |
| CN | 202541450 U | 11/2012 |
| WO | WO 2009/099342 A2 | 8/2009 |

* cited by examiner

ELECTRIC VEHICLE RUNNING CONTROL SYSTEM

CROSS-REFERENCE TO RELATED APPLICATION

This application claims priority to PCT/CN2013/070644, filed Jan. 18, 2013, which claims priority to Chinese Application No. 201210015386.4, filed Jan. 18, 2012, the entire contents each of which is incorporated herein by reference.

TECHNICAL FIELD

The present disclosure relates to a power electric field, and more specially, relates to an electric vehicle running control system.

BACKGROUND

Electric vehicles may run on varying road conditions. Battery capacity may be of limited use if the battery does not deliver the stored energy effectively. The battery may need low internal resistance to enhance efficiency. Because cold may increase resistance battery of the electric vehicles may perform poorly at low temperatures. To provide extra run time, heating circuitry may be employed to lower the internal resistance of the battery.

FIG. 1 is a schematic diagram of the electric vehicle running control system of the prior art. As shown in FIG. 1, a heating circuit F may be connected with an in-vehicle battery E. By controlling energy flowing between the in-vehicle battery E and the heating circuit F temperature at which the battery performs may increase thus improving charge and discharge rate performance of the in-vehicle battery E.

However, if the heating circuit F is working while the electric vehicle is running, a load capacitor C may supply power to load R. In this manner, the heating circuit F and the load capacitor C may work simultaneously which may cause the voltage of the in-vehicle battery E to fluctuate violently (even to become a negative value). The load R may affect performance of the heating circuit. FIG. 2 shows schematic waveform generated by the heating circuit F and the load capacitor C. VF is a voltage of the heating circuit F. VC is an output voltage of the load capacitor C.

SUMMARY

The present disclosure is aimed to solve at least one of the problems, particularly defects that a heating circuit can not work normally due to an interference between a heating circuit and a load capacitor caused by heating during the running.

According to exemplary embodiments, an electric vehicle running control system is provided. The electric vehicle running control system comprises a heating circuit coupled with an in-vehicle battery and configured to heat the in-vehicle battery. The vehicle running control system further comprises a load capacitor and a first current storage element. The first current storage element may be coupled with the load capacitor and the heating circuit respectively configured to reduce interference between the heating circuit and the load capacitor.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
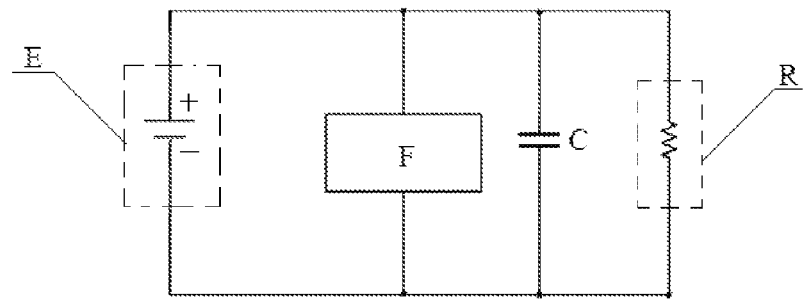
FIG. 1 is a schematic diagram of an electric vehicle running control system of the prior art.
Figure 2:
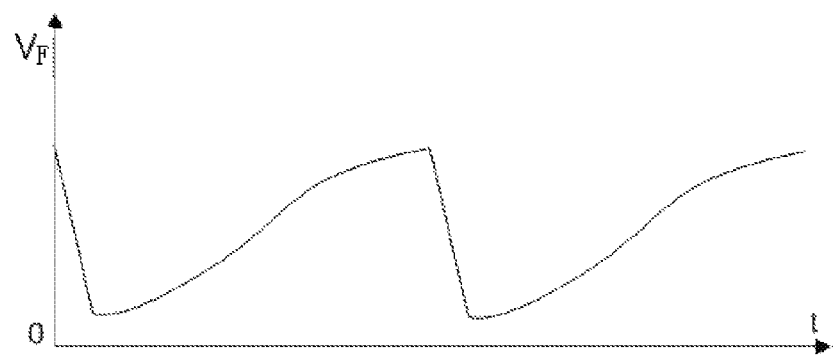
FIG. 2 shows schematic waveform of a heating circuit and a load capacitor of the prior art.
Figure 2:
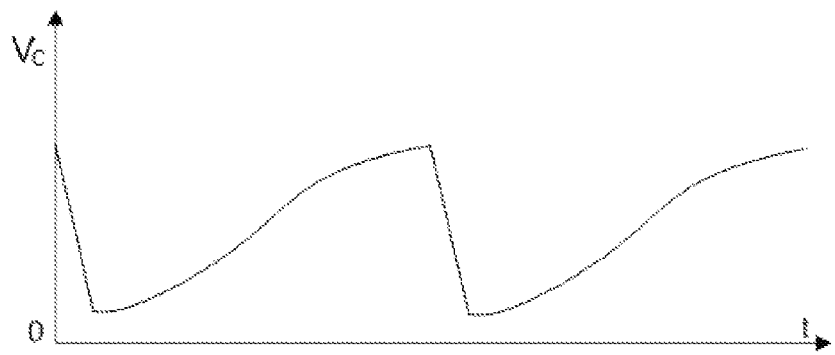

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

It should be noted that, unless otherwise specified, in the following description, the term "heating circuit controlling module" refers to any controller which can output control instructions (such as a pulse waveform) according to predetermined conditions or at predetermined times to control status of a heating circuit, such as a PLC (Programming Logic Controller). The term "bidirectional switch" refers to any bidirectional switch that may operate to change state of circuit according to electric signals or self-characteristics. For example, the bidirectional switch may be a MOSFEF (Metal Oxide Semiconductor Field Effect Transistor) or an IGBT (Insulated Gate Bipolar Transistor) with a reverse freewheeling diode. The term "charge storage element" refers to any device which may store charges. For example, the charge storage element may be a capacitor. The term "current storage element" refers to any device that may store current. For example, the current storage element may be an inductor. The term "forward direction" refers to a direction in which energy flows from the in-vehicle battery to the heating circuit. The term "reverse direction" refers to a direction in which energy flows from the heating circuit to the in-vehicle battery. The term "in-vehicle battery" may comprise a primary battery (such as a dry battery or an alkaline battery) and a secondary battery (such as a lithium ion battery, a nickel cadmium battery, a nickel-metal hydride battery or a lead-acid battery). The term "damping element" refers to any device that may consume energy by blocking the current flowing. For example, the damping element may be a resistor. The term "heating loop" refers to a loop formed by the in-vehicle battery and the heating circuit.

Figure 3:
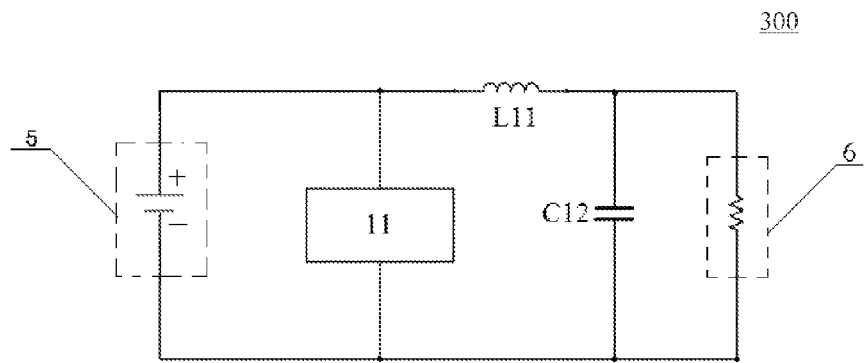
FIG. 3 is a schematic diagram of an electric vehicle running control system in accordance with exemplary embodiments of the disclosure.

FIG. 3 is a schematic diagram of an electric vehicle running control system 300 in accordance with exemplary embodiments of the disclosure. As shown in FIG. 3, the system 300 may comprise a heating circuit 11 and a load capacitor C12. The heating circuit 11 may be coupled to an in-vehicle battery 5 to form a heating loop. In a predefined condition, the heating circuit 11 may heat the in-vehicle batter 5 to increase temperature. The load capacitor C12 coupled in parallel with the heating circuit 11 may supply energy to a vehicle load 6. The system 300 may further comprise a current storage element L11 coupled between the load capacitor C12 and the heating circuit 11.

The current storage element L11 and the load capacitor C12 may be connected in series to form an LC filter circuit. When the heating circuit 11 is working while the electric vehicle is running, the LC filter circuit may eliminate violent voltage fluctuation generated by the heating circuit 11 and reduce an output ripple voltage across the load capacitor C12. The heating circuit 11 and the load capacitor C12 may work simultaneously without interference with each other.

Figure 4:
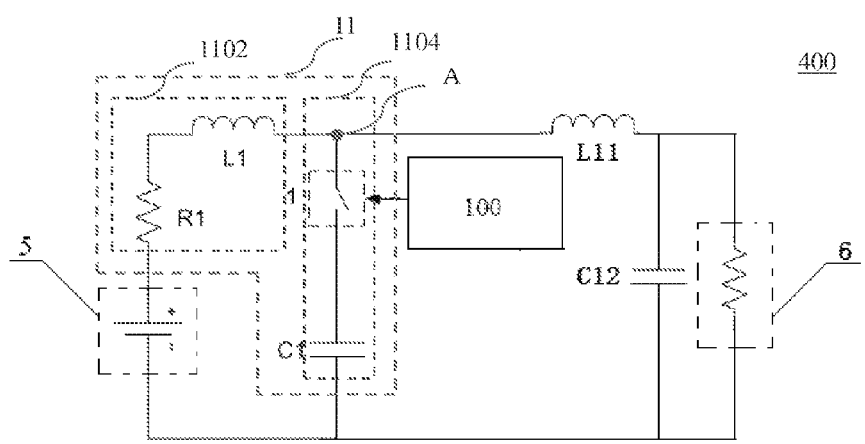
FIG. 4 is a schematic diagram of a heating circuit in an electric vehicle running control system in accordance with exemplary embodiments of the disclosure.

FIG. 4 is a schematic diagram of an electric vehicle running control system 400 in accordance with exemplary embodiments of the disclosure. As shown in FIG. 4, the heating circuit 11 may comprise a damping element R1, a current storage element L1, a bidirectional switchgear 1, and a charge storage element C1 in series. The damping element R1 and the current storage element L1 may form a first circuit 1102. The bidirectional switchgear 1 and the charge storage element C1 may form a second circuit 1104. The current storage element L11 may be coupled to a node A between the first circuit 1102 and the second circuit 1104. In other embodiments, the damping element R1 and the current storage element L1 in the first circuit 1102 may be switched. The bidirectional switchgear 1 and the charge storage element C1 in the second circuit 1104 may be switched. As shown in FIG. 4, the system 400 may further comprise a heating circuit control module 100. The heating circuit control module 100 may be coupled to the bidirectional switchgear 1, and configured to control connection between the heating circuit 11 and the in-vehicle battery 5 by controlling state of the bidirectional switchgear 1.

The "in-vehicle battery" may refer to an ideal battery which may comprise small or may not comprise internal parasitic resistor or internal parasitic inductor. The "in-vehicle battery" may also refer to a battery pack which may comprise internal parasitic resistor and internal parasitic inductor. Therefore, it should be understood when the "in-vehicle battery" refers to an ideal battery, the damping element R1 and the current storage element L1 may be external to the in-vehicle battery. When the "in-vehicle battery" refers to a battery pack the damping element R1 and the current storage element L1 may be internal or external to the battery pack.

Figure 5A:
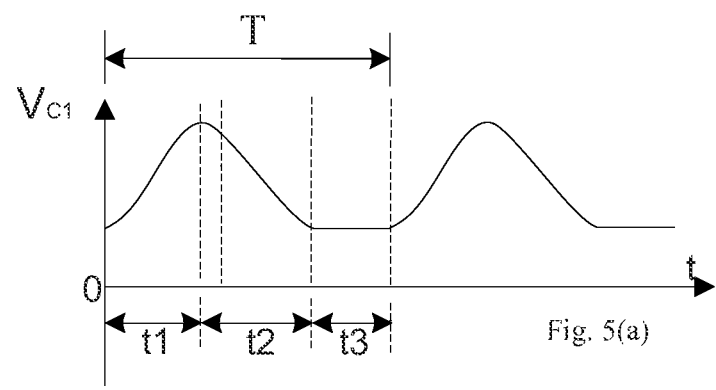
FIGS. 5(a), (b), and (c) show schematic waveforms generated by a heating circuit and a load capacitor in accordance with exemplary embodiments of the disclosure.
Figure 5B:
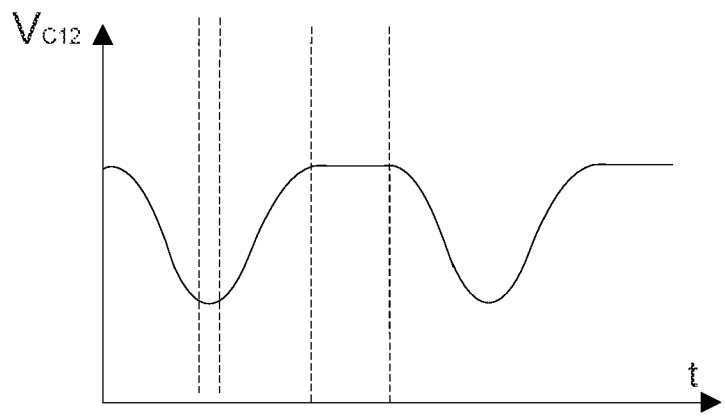
Figure 5C:
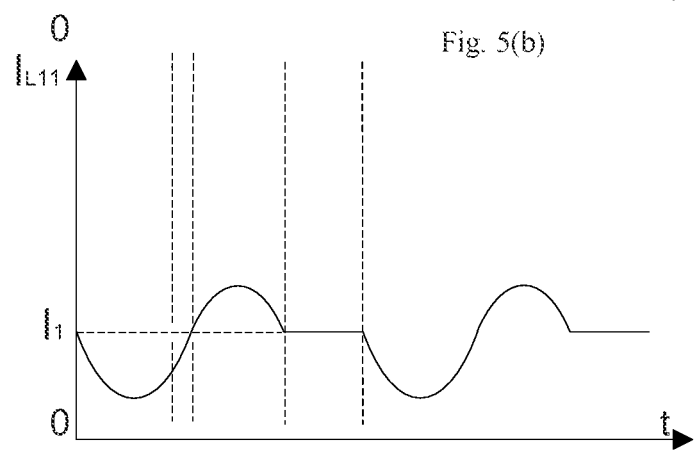

FIG. 5 shows a schematic waveform generated by the heating circuit 11 and the load capacitor C12. With references to FIGS. 3, 4, and 5, T is working cycle by an electric running control system such as the electric running control system 300 illustrated in FIG. 3 and the system 400 in FIG. 4. $V_{C1}$ is a voltage across the charge storage element C1. $V_{C12}$ is a voltage across the load capacitor C12. $I_{L11}$ is a current flowing into the current storage element L11. $I_1$ is a current flowing from the load capacitor C12 to the vehicle load 6. When the current $I_{L11}$ is greater than the current $I_1$, the voltage $V_{C12}$ raises. When the current is less than the current $I_1$, the voltage $V_{C12}$ may fall. If the current $I_{L11}$ is equal to the current $I_1$, the voltage $V_{C12}$ keeps constant.

In operation, when a predefined heating condition is reached, the heating circuit control module 100 may control state of the bidirectional switchgear 1 to connect or disconnect the heating circuit 11 to or from the in-vehicle battery. The in-vehicle battery 5 may charge the charge storage element C1. The voltage $V_{C1}$ of the charge storage element C1 may rise during time period t1, as shown in FIG. 5(a). The in-vehicle battery 5 may also charge the load capacitor C12 through the current storage element L11. The load capacitor C12 may supply energy to the vehicle load 6. Because the current $I_{L11}$ flowing through the current storage element L11 is less than the current $I_1$ flowing from the load capacitor C12 to the vehicle load 6 the output voltage $V_{C12}$ across the load capacitor C12 may fall during time period t1, as shown in FIG. 5(b).

When the current in the heat circuit 11 reaches zero, the charge storage element C1 may charge the in vehicle battery 5. The charge storage element C1 may also charge the load capacitor C12 through the current storage element L11. The voltage $V_{C1}$ of the charge storage element C1 may fall. The load capacitor C12 may provide energy to the vehicle load 6. During the charging and discharging process of the in-vehicle battery 5, both forward current and reverse current in the loop may flow through the damping element R1. Because the current $I_{L11}$ flowing through the current storage element L11 is greater than the current $I_1$ flowing from the load capacitor C12 to the vehicle load 6, the output voltage $V_{C12}$ of the load capacitor C12 may rise during time period t2, as shown in FIG. 5(b).

When the charge storage element C1 discharges to the lowest voltage, the heating circuit control module 100 may control the bidirectional switchgear 1 to disconnect the heating circuit 11 from the in-vehicle battery 5 to keep the voltage value $V_{C1}$ of the charge storage element C1 constant. During this time period, the load capacitor C12 may provide energy to the vehicle load 6. As the current $I_{L11}$ flowing through the current storage element L11 is equal to the current $I_1$ flowing from the load capacitor C12 to the vehicle load 6, the output voltage value $V_{C12}$ of the load capacitor C12 may be constant during time period t3 as shown in FIG. 5(b).

The current storage element L11 and the load capacitor C12 may form an LC filter circuit, when the in-vehicle battery is heated and the vehicle is running. The LC filter circuit may eliminate negative voltage generated by the heating circuit 1 and reduce output voltage ripple across the load capacitor C12 thereby achieving stable output voltage across the load capacitor C12.

Figure 6:
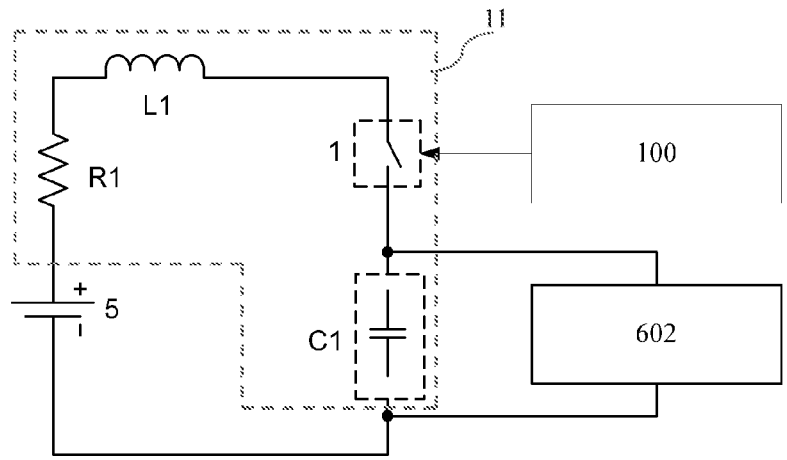
FIGS. 6 and 7 are a schematic diagram of exemplary energy summing units in accordance with exemplary embodiments of the disclosure.

Energy may be not completely discharged from the charge storage element C1. Some energy may be remained in the charge storage element C1. The accumulation of the energy may prevent heating circuit 11 from working properly and effectively. To facilitate discharges from the charge storage element C1, the heating circuit 11 further comprises an energy summing unit 602, as shown in FIG. 6.

The energy summing unit 602 may be coupled with the current storage element L1 and the charge storage element C1. The energy summing unit 602 may sum the energy in the heating circuit 11 and the energy in the in-vehicle battery 5 after the bidirectional switchgear 1 is turned to off state. When the bidirectional switchgear 1 is turned to on state, the in-vehicle battery 5 may charge the summed energy to the charge storage element C1.

Figure 7:
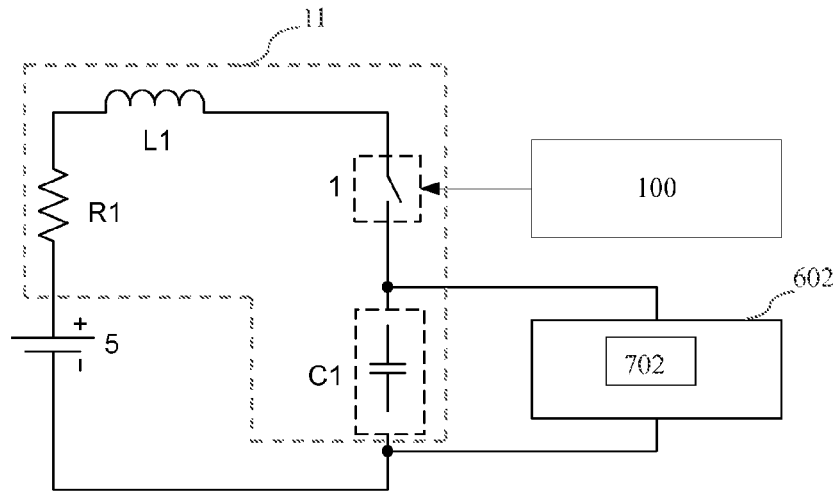

FIG. 7 is a schematic diagram of an exemplary energy summing unit. As shown in FIG. 7, the energy summing unit 602 may comprise a polarity reversing unit 702. The polarity reversing unit 702 may be coupled with the current storage element L1 and the charge storage element C1, and reverse a voltage polarity of the charge storage element C1 after the bidirectional switchgear 1 is turned to off state. After the voltage polarity of the charge storage element C1 is reversed, the voltage polarity of the in-vehicle battery 5 and the voltage polarity of the charge storage element C1 may be in series. When the bidirectional switchgear 1 is turned to on state, the energy in the charge storage element C1 may be summed up with the energy in the in-vehicle battery 5. The polarity reversing unit 702 may also comprise a current storage element (not shown) to limit the current flowing from the heating circuit 11 to the in-vehicle battery 5 when the voltage polarity of the charge storage element C1 is reversed.

Figure 8:
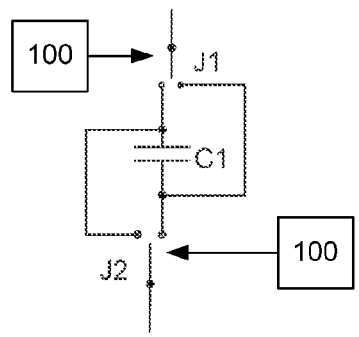
FIGS. 8-10 are schematic diagrams of exemplary polarity reversing units in accordance with exemplary embodiments of the disclosure.

FIG. 8 is a schematic diagram of the polarity reversing unit 702. As shown in FIG. 8, the polarity reversing unit 702 may comprise a single-pole double-throw switch J1 and a single-pole double-throw switch J2. The single-pole double-throw switch J1 may be coupled to both ends of the charge storage element C1. A lead-in wire of the single-pole double-throw switch J1 may be coupled to the heating circuit 11 (shown in FIG. 7). A first lead-out wire of the single-pole double-throw switch J1 may be coupled with a first pole plate of the charge storage element C1. A second lead-out wire of the single-pole double-throw switch J1 may be coupled with a second pole plate of the charge storage element C1. The single-pole double-throw switch J2 may be coupled to both ends of the charge storage element C1. A lead-in wire of the single-pole double-throw switch J2 may be coupled to the heating circuit 11. A first lead-out wire of the single-pole double-throw switch J2 may be coupled with the second pole plate of the charge storage element C1. A second lead-out wire of the single-pole double-throw switch J2 may be coupled with the first pole plate of the charge storage element C1. The heating circuit control module 100 may be coupled with the single-pole double-throw switch J1 and the single-pole double-throw switch J2, respectively, to reverse the voltage polarity of the charge storage element C1 by changing connection relations between the lead-in wire and the lead-out wires of the single-pole double-throw switch J1, and the lead-in wire and the lead-out wires of the single-pole double-throw switch J2.

The connection relation between the lead-in wire and the lead-out wires of the single-pole double-throw switch J1 and the lead-in wire and the lead-out wires of the single-pole double-throw switch J2 may be preset: when the bidirectional switchgear 1 is in on state, the lead-in wire of the single-pole double-throw switch J1 may be coupled with the first lead-out wire of the single-pole double-throw switch J1. The lead-in wire of the single-pole double-throw switch J2 may be coupled with the first lead-out wire of the single-pole double-throw switch J2. When the bidirectional switchgear 1 is turned to off state, the heating circuit control module 100 may connect the lead-in wire of the single-pole double-throw switch J1 to the second lead-out wire of the single-pole double-throw switch J1 and the lead-in wire of the single-pole double-throw switch J2 to the second lead-out wire of the single-pole double-throw switch J2. In this way, the voltage polarity of the charge storage element C1 is reversed.

Figure 9:
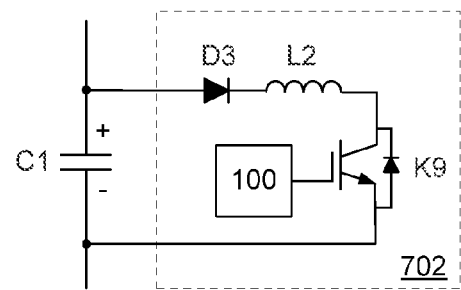

FIG. 9 is a schematic diagram of another embodiment of the polarity reversing unit 702. As shown in FIG. 9, the polarity reversing unit 702 may comprise a unidirectional semiconductor element D3, a current storage element L2, and a switch K9. The charge storage element C1, the current storage element L2 and the switch K9 may be coupled in series. The unidirectional semiconductor element D3 may be coupled between the charge storage element C1 and the current storage element L2 or between the current storage element L2 and the switch K9. The heating circuit control module 100 may be coupled with the switch K9 to reverse the voltage polarity of the charge storage element C1 by controlling state of the switch K9.

According to the above embodiment, when the bidirectional switchgear 1 is turned to off state, the heating circuit control module 100 may turn the switch K9 to on state. Accordingly, the charge storage element C1, the unidirectional semiconductor element D3, the current storage element L2, and the switch K9 may form an LC oscillation loop. The charge storage element C1 may discharge through the current storage element L2. The voltage polarity of the charge storage element C1 may be reversed when the current in the oscillation loop reaches zero after passing through a positive half period.

Figure 10:
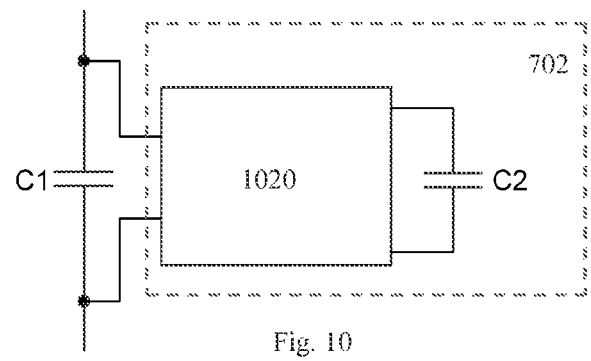

FIG. 10 is a schematic diagram of another embodiment of the polarity reversing unit 702. As shown in FIG. 10, the polarity reversing unit 702 may comprise a DC-DC module 1020 and a charge storage element C2. The DC-DC module 1020 may be coupled with the charge storage element C1 and the charge storage element C2, respectively. The heating circuit control module 100 (not shown) may also be coupled with the DC-DC module 1020 and configured to transfer energy between the charge storage element C1 and the charge storage element C2 to reverse the voltage polarity of the charge storage element C1. The DC-DC module 1020 may comprise a DC-DC (direct current to direct current) converting circuit, and/or the like to reverse the voltage polarity.

Figure 11:
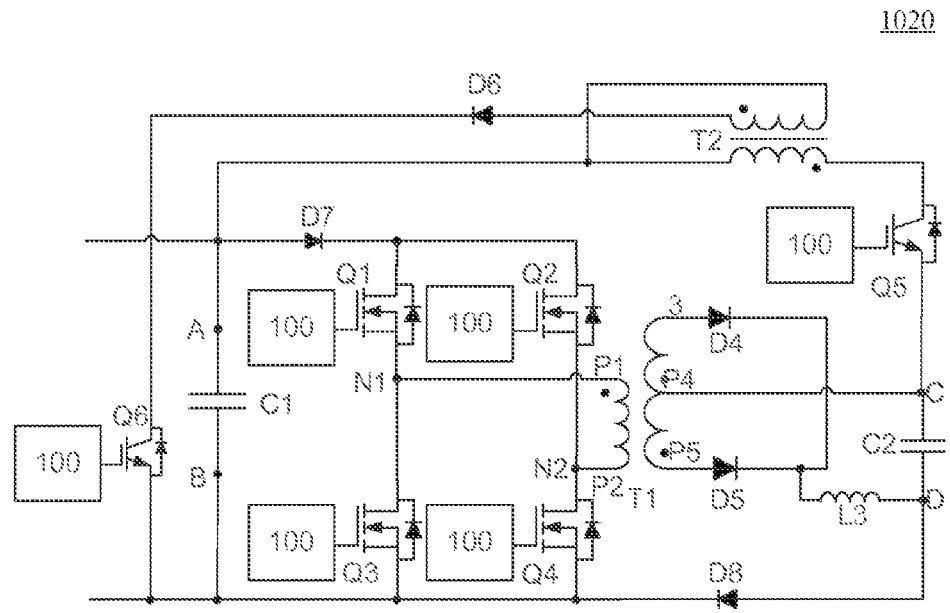
FIG. 11 is a schematic diagram of an exemplary DC-DC module in accordance with exemplary embodiments of the disclosure.

FIG. 11 is a schematic diagram of an embodiment of the DC-DC module 1020. As shown in FIG. 11, the DC-DC module 1020 may comprise bidirectional switches Q1, Q2, Q3, Q4, Q5, and Q6, a transformer T1 and a transformer T2, unidirectional semiconductor elements D4, D5, D6, D7, and D8, a current storage element L3.

In this embodiment, the bidirectional switches Q1, Q2, Q3, and Q4 may be MOSFETs. The bidirectional switches Q5 and Q6 may be IGBTs. Pin P1, pin P4, and pin P5 of the transformer T1 are dotted terminals. Pin P2 and pin P3 of the transformer T2 are dotted terminals.

An end, such as anode of the unidirectional semiconductor element 177 may be coupled with one end A of the capacitor C1. The other end, such as cathode of the unidirectional semiconductor element D7 may be coupled with drain terminals of the bidirectional switch Q1 and the bidirectional switch Q2, respectively. Source terminal of the bidirectional switch Q1 may be coupled with drain terminal of the bidirectional switch Q3. Source terminal of the bidirectional switch Q2 may be coupled with drain terminal of the bidirectional switch Q4. Both the source terminals of the bidirectional switch Q3 and the bidirectional switch Q4 may be coupled with the other end B of the capacitor C1. A full bridge circuit is then formed. The voltage polarity of the end A of the capacitor C1 may be positive. The voltage polarity of the end B may be negative.

In the full bridge circuit, the bidirectional switch Q1 and the bidirectional switch Q2 may be upper bridge arms. The bidirectional switch Q3 and the bidirectional switch Q4 may be lower bridge arms. The full bridge circuit may be coupled with the charge storage element C2 through the transformer T1. Pin P1 of the transformer T1 may be coupled with a first node N1. Pin P2 of the transformer T1 may be coupled with a second node N2. Pin P3 and pin P5 of the transformer T1 may be coupled with anodes of the unidirectional semiconductor element D4 and the unidirectional semiconductor element D5, respectively. The cathodes of the unidirectional semiconductor element D4 and the unidirectional semiconductor element D5 may be coupled with one end of the current storage element L3. The other end of the current storage element L3 may be coupled with an end D of the charge storage element C2. Pin P4 of the transformer T1 may be coupled with an end C of the charge storage element C2. The anode of the unidirectional semiconductor element D8 may be coupled with the end D of the charge storage element C2. The cathode of the unidirectional semiconductor element D8 may be coupled with the end B of the charge storage element C1. In this way, the voltage polarity of the end C of the charge storage element C2 may be negative. The voltage polarity of the end D may be positive.

In FIG. 11, the end C of the charge storage element C2 may be coupled with an emitter terminal of the bidirectional switch Q5. A collector terminal of the bidirectional switch Q5 may be coupled with pin P2 of the transformer T2. Pin P1 of the transformer T2 may be coupled with end A of the charge storage element C1. Pin P4 of the transformer T2 may be coupled with end C of the charge storage element C2. Pin P3 of the transformer T2 may be coupled with the anode of the unidirectional semiconductor element D6. Cathode terminal of the unidirectional semiconductor element D6 may be coupled with a collector terminal of the bidirectional switch Q6. An emitter terminal of the bidirectional switch Q6 may be coupled with the end B of the charge storage element C1. States of the bidirectional switches Q1, Q2, Q3, Q4, Q5 and Q6 may be controlled by the heating circuit control module 100.

In operation, when the bidirectional switchgear 1 turned to off state, the heating circuit control module 100 may turn the bidirectional switches Q1, Q4, Q5, and Q6 to on state, and turn the bidirectional switches Q2 and Q3 to off state in a first half cycle, such as a positive half cycle. The heating circuit control module 100 may turn the bidirectional switch Q2 and the bidirectional switch Q3 to on state, and turn the bidirectional switches Q1, Q4, Q5, and Q6 to off state in a second half cycle, such as a negative half cycle. The heating circuit control module 100 may control the DC-DC module 1020 to switch between the first half cycle and the second half cycle alternatively.

When the full bridge circuit works, the energy in the charge storage element C1 may be transferred to the charge storage element C2 through the transformer T1, the unidirectional semiconductor element D4, the unidirectional semiconductor element D5, and the current storage element L3. The voltage polarity of the end C of the charge storage element C2 may be negative, and the voltage polarity of the end D may be positive.

The heating circuit control module 100 may control the bidirectional switch Q5 in on state. The charge storage element C1, the charge storage element C2, the transformer T2, and the unidirectional semiconductor element D8 may be in series. Energy in the charge storage element C2 may be transferred to the charge storage element C1. Part of the energy may be stored in the transformer T2. The heating circuit control module 100 may control the bidirectional switch Q5 to be turned to off state and the bidirectional switch Q6 in on state. The energy stored in the transformer T2 may be transferred to the charge storage element C1 through the transformer T2 and the unidirectional semiconductor element D6 to charge the charge storage element C1. The voltage polarity of the end A of the charge storage element C1 may be reversed to be negative. The voltage polarity of the end B of the charge storage element C1 may be reversed to be positive. The voltage polarity of the charge storage element C1 may be reversed. The voltage polarity of the charge storage element C1 may be reversed by other circuit, such as a charge pump.

Figure 12:
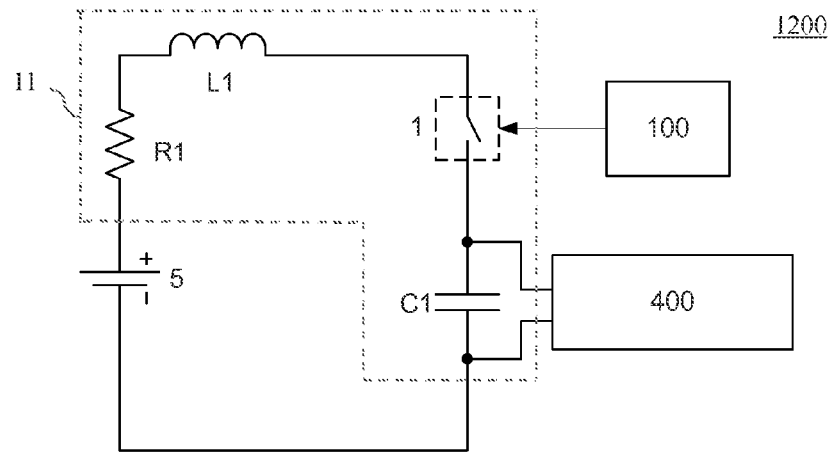
FIGS. 12 and 13 is a schematic diagram of exemplary electric vehicle running control systems in accordance with exemplary embodiments of the disclosure.

FIG. 12 is a schematic diagram of an exemplary electric vehicle running control system 1200 in accordance with exemplary embodiments of the disclosure. As shown FIG. 12, the system 1200 may comprise an energy transferring unit 400. The energy transferring unit 400 may be coupled with the current storage element L1 and the charge storage element C1. The energy transferring unit 400 may transfer the energy in the heating circuit 11 to an energy storage element after the bidirectional switchgear 1 is turned to off state. The energy transferring unit 400 may recycle the energy in the heating circuit 11. The energy storage element may be the in-vehicle battery 5. The energy storage element may also be an external capacitor, a low temperature battery, a power grid and/or any circuit.

Figure 13:
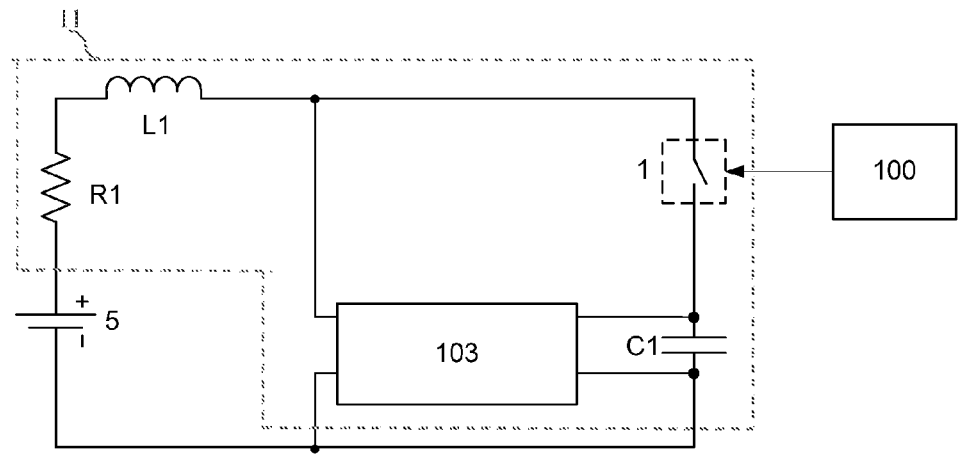

The energy transferring unit 400 may comprise an electric power recharging unit 103. The electric power recharging unit 103, the current storage element L1, and the charge storage element C1 may be coupled in series, as shown in FIG. 13, to transfer the energy in the heating circuit 11 to the in-vehicle battery 5 when the bidirectional switchgear 1 is turned to off state.

When the energy in the heating circuit 11 is transferred to the in-vehicle battery 5 by the electric power recharging unit 103, the energy transferred can be reused after the bidirectional switchgear 1 is in on state again, thereby increasing the efficiency of the heating circuit 11.

Figure 14:
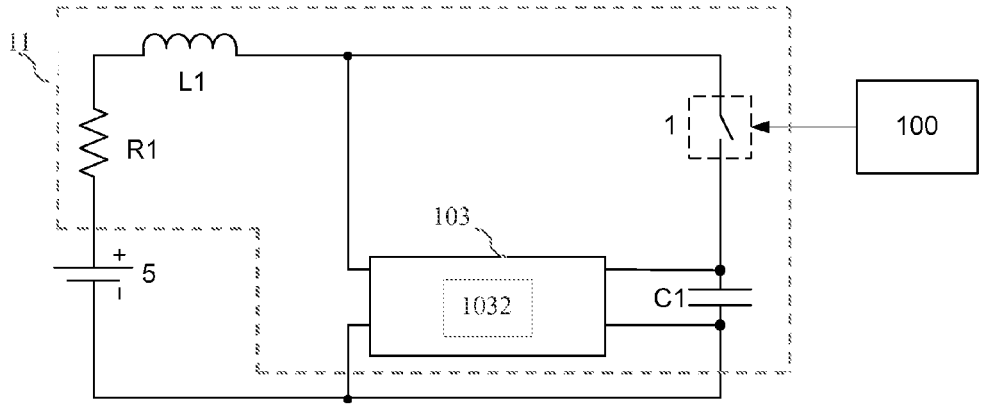
FIG. 14 is a schematic diagram of an exemplary electric power recharging unit in accordance with exemplary embodiments of the disclosure.

FIG. 14 is a schematic diagram of the electric power recharging unit 103 in accordance with exemplary embodiments of the disclosure. As shown in FIG. 14, the electric power recharging unit 103 may comprise a DC-DC module 1032. The DC-DC module 1032 may be coupled with the charge storage element C1 and the in-vehicle battery 5, respectively. The heating circuit control module 100 may be coupled with and control the DC-DC module 1032 to transfer the energy from the charge storage element C1 to the in-vehicle battery 5. The DC-DC module 1032 may be any circuit, such as a DC-DC converting circuit, to transfer energy and reverse the voltage polarity.

Figure 15:
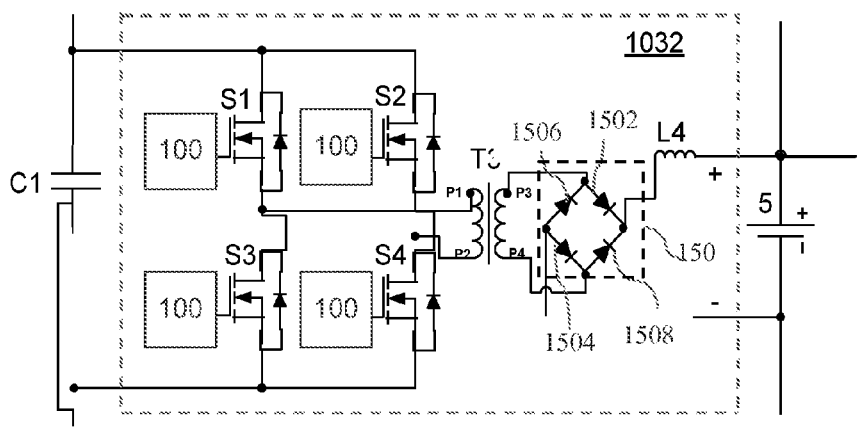
FIG. 15 is a schematic diagram of an exemplary DC-DC module in accordance with exemplary embodiments of the disclosure.

FIG. 15 is a schematic diagram of the DC-DC module 32. As shown in FIG. 15, the DC-DC module 1032 may comprise bidirectional switches S1, S2, S3, and S4, a transformer T3, a current storage element L4, and unidirectional semiconductor elements 1502, 1504, 1506 and 1508. In this embodiment, the bidirectional switches S1, S2, S3, and S4 may be MOS- FETs. The heating circuit control module 100 may also control the states of the bidirectional switches S1, S2, S3, and S4.

A source terminal of the bidirectional switch S1 may be coupled with a drain terminal of the bidirectional switch S3. A source terminal of the bidirectional switch S2 may be coupled with a drain terminal of the bidirectional switch S4. Drain terminals of the bidirectional switch S1 and the bidirectional switch S2 may be coupled with positive end of the charge storage element C1. Source terminals of the bidirectional switch S3 and the bidirectional switch S4 may be coupled with the negative end of the charge storage element C1.

A bridge rectifier circuit 150 may be coupled between the transformer T3 and the in-vehicle battery 5. The in-vehicle battery 5 may supply power to the bridge rectifier circuit 150. The bridge rectifier circuit 150 may comprise unidirectional semiconductor elements 1502, 1504, 1506 and 1508 arranged in series pairs with two diodes conducting current during each half cycle. During a first half cycle of the supply, such as a positive half cycle, the unidirectional semiconductor elements 1502 and 1504 may conduct in series while the unidirectional semiconductor elements 1506 and 1508 are reverse biased. During a second half cycle of the supply, such as a negative half cycle, the unidirectional semiconductor elements 1506 and 1508 may conduct in series while the unidirectional semiconductor elements 1502 and 1504 are reverse biased.

In the full bridge circuit, the bidirectional switch S1 and the bidirectional switch S2 may be upper bridge arms. The bidirectional switch S3 and the bidirectional switch S4 may be lower bridge arms. Pin P1 of the transformer T3 may be coupled between source terminal of the bidirectional switch S1 and drain terminal of the bidirectional switch S3. Pin P2 of the transformer T3 may be coupled between the source terminal of the bidirectional switch S2 and drain terminal of the bidirectional switch S4. Pin P3 and pin P4 of the transformer T3 may be coupled to the bridge rectifier circuit 150.

With references to FIGS. 14 and 15, in operation, when the bidirectional switchgear 1 is turned to off state, the heating circuit control module 100 may turn the bidirectional switch S1 and the bidirectional switch S4 to off state in a first half cycle, for example, a positive half cycle, and turn the bidirectional switch S2 and the bidirectional switch S3 to on state in a second half cycle, for example, a negative half cycle. The heating circuit control module 100 may control the bridge rectifier circuit 150 to switch between the positive half cycle and the negative half cycle.

When the full bridge circuit works, the transformer T3 and the bridge rectifier circuit 150 may transfer the energy from the charge storage element C1 to the in-vehicle battery 5. The rectifier circuit may convert an input alternating current into a direct current and then output the direct current to the in-vehicle battery 5 to recharge the electric power. In other embodiments, a charge pump may also be implemented to transfer the energy from the heating circuit 11.

Figure 16:
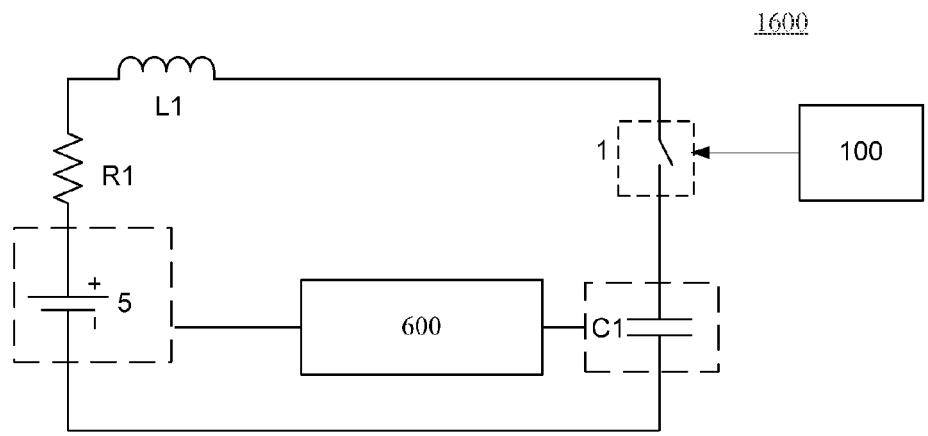
FIG. 16 is a schematic diagram of an electric vehicle running control system in accordance with exemplary embodiments of the disclosure.

FIG. 16 is a schematic diagram of an electric vehicle running control system 1600 in accordance with exemplary embodiments of the disclosure. As shown in FIG. 16, the system 1600 may further comprise an energy summing and transferring unit 600. The energy summing and transferring unit 600 may be coupled with the current storage element L1 and the charge storage element C1 to transfer energy from the heating circuit 11 to the energy storage element 500 after the bidirectional switchgear 1 is turned to off state. The energy summing and transferring 600 may then sum energy remained in the heating circuit 11 and energy in the in-vehicle battery 5 thereby increasing efficiency of the heating circuit 11 and recycle the energy remained in the heating circuit 11.

The energy remained in the heating circuit 11 and the energy in the in-vehicle battery 5 may be summed by reversing the voltage polarity of the charge storage element C1. After the voltage polarity of the charge storage element C1 is reversed, the voltage polarity of the charge storage element C1 is the same as that of the in-vehicle battery 5. When the bidirectional switchgear 1 is in on state, the energy in the in-vehicle battery 5 and the charge storage element C1 may be summed up.

Figure 17:
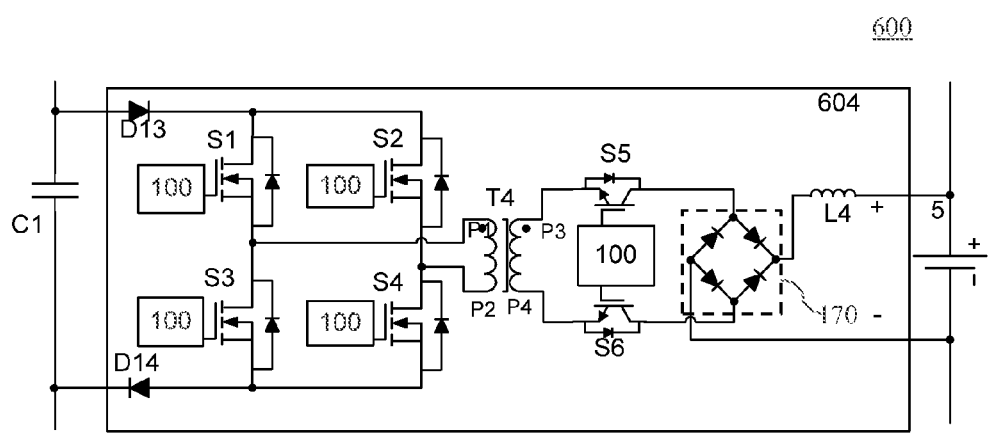
FIG. 17 is a schematic diagram of an exemplary energy summing and transferring unit in accordance with exemplary embodiments of the disclosure.

FIG. 17 is a schematic diagram of an exemplary energy summing and transferring unit 600 in accordance with exemplary embodiments of the disclosure. As shown in FIG. 17, the energy summing and transferring unit 600 may comprise a DC-DC module 604. The DC-DC module 604 may be coupled between the charge storage element C1 and the in-vehicle battery 5. The DC-DC module 604 may be any circuit, such as a DC-DC converting circuit, for transferring the energy and reversing the voltage polarity. As shown in FIG. 17, the DC-DC module 604 may comprise bidirectional switches S1, S2, S3, S4, S5, and S6, a transformer T4, one or more unidirectional semiconductor elements, such as D13 and D14, and a current storage element L4. In the embodiment, the bidirectional switches S1, S2, S3, and S4 may be MOSFETs. The bidirectional switches S5 and S6 may be IGBTs.

The heating circuit control module 100 may also be coupled with the DC-DC module 604 for transferring energy from the charge storage element C1 to the energy storage element 500 (shown in FIG. 12), and control the DC-DC module 604 to sum energy remained in the charge storage element C1 and the energy in the in-vehicle battery 5. The heating circuit control module 100 may also control states of the bidirectional switches S1, S2, S3, S4, S5, and S6.

A bridge rectifier circuit 170 may be coupled between the transformer T4 and the in-vehicle battery 5. The in-vehicle battery 5 may supply power to the bridge rectifier circuit 170. The bridge rectifier circuit 170 may be similar to the bridge rectifier circuit 150 that have been described in FIG. 15 and operate in similar manner.

When the full bridge circuit works, the transformer T3 and the bridge rectifier circuit 170 may transfer the energy from the charge storage element C1 to the in-vehicle battery 5. The bridge rectifier circuit 170 may convert an alternating current input into a direct current and then output the direct current to the in-vehicle battery 5 to recharge the electric power. In other embodiments, a charge pump may also be implemented to transfer the energy from the heating circuit 11.

With references to FIGS. 16 and 17, in operation, when the bidirectional switchgear 1 is turned to off state, the heating circuit control module 100 may turn the bidirectional switches S1, S4, S5, and S6 to on state in a first half cycle, for example, a positive half cycle, and turn the bidirectional switch S2 and the bidirectional switch S3 to on state in a second half cycle, for example, a negative half cycle. The heating circuit control module 100 may control the bridge rectifier circuit 150 to switch between the positive half cycle and the negative half cycle to form a full bridge circuit.

When the full bridge circuit works, the transformer T4 and the bridge rectifier circuit 150 may transfer the energy from the charge storage element C1 to the in-vehicle battery 5. The rectifier circuit may convert an input alternating current into a direct current and then output the direct current to the in-vehicle battery 5 to recharge the electric power.

When the polarity of the charge storage element C1 needs to be reversed to sum the energy, the heating circuit control module 100 may turn the bidirectional switches S5 and S6 to off state, and turn the bidirectional switches S1 and S4 or S2 and S3 to on state. In this manner, the energy in the charge storage element C1 may flow in a reversed direction, such as from the positive end to the negative end of the charge storage element C1 through the bidirectional switch S1, a primary side of the transformer T4 and the bidirectional switch S4. The energy in the charge storage element C1 may also flow from the positive end to the negative end of the charge storage element C1 through the bidirectional switch S2, the primary side of the transformer T4 and the bidirectional switch S3. In this way, the voltage polarity of the charge storage element C1 may be reversed by a magnetic inductance of the primary side of the transformer T4.

In another embodiment, the energy summing and transferring unit 600 may comprise an energy summing unit and an energy transferring unit. The energy transferring unit may be coupled between the current storage element L1 and the charge storage element C1 for transferring energy in the heating circuit 11 to an energy storage element after the bidirectional switchgear 1 is turned to off state. The energy summing unit may also be coupled between the current storage element L1 and the charge storage element C1 to sum the remaining energy in the heating circuit 11 and the energy in the in-vehicle battery 5 after the energy transferring unit transfers the energy to the energy storage element. A charge pump may also be implemented to transfer and sum the energy in the heating circuit 11.

Figure 18:
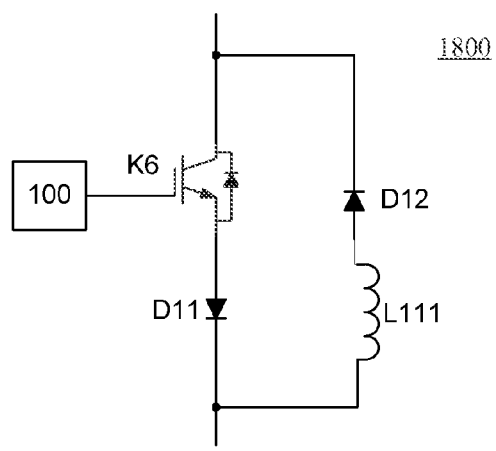
FIGS. 18-19 are schematic diagrams of exemplary bidirectional switchgear in accordance with exemplary embodiments of the disclosure.

FIG. 18 illustrates a bidirectional switchgear 1800 in accordance with an exemplary embodiment of the disclosure. The bidirectional switchgear 1800 may comprise a switch K6, a unidirectional semiconductor element D11, a unidirectional semiconductor element D12, and an energy limiting circuit, such as a current storage element L111. The switch K6 and the unidirectional semiconductor element D11 may be coupled in series to form a first unidirectional branch. The unidirectional semiconductor element D12 and the current storage element L111 may be coupled in series to form a second unidirectional branch. The first unidirectional branch may control energy flow from the in-vehicle battery 5 to the heating circuit 11 and the second unidirectional branch may control energy flow from the heating circuit 11 to the in-vehicle battery 5. The heating circuit control module 100 may be coupled with at least one of the first unidirectional branch and the second unidirectional branch to control conduction of the first unidirectional branch and the second unidirectional branch. The heating circuit control module 100 may be coupled to the switch K6 to turn the first unidirectional branch to off state or on state. A heating process may be initialed by turning the switch K6 to on state, and stopped by turning the switch K6 to off state.

Figure 19:
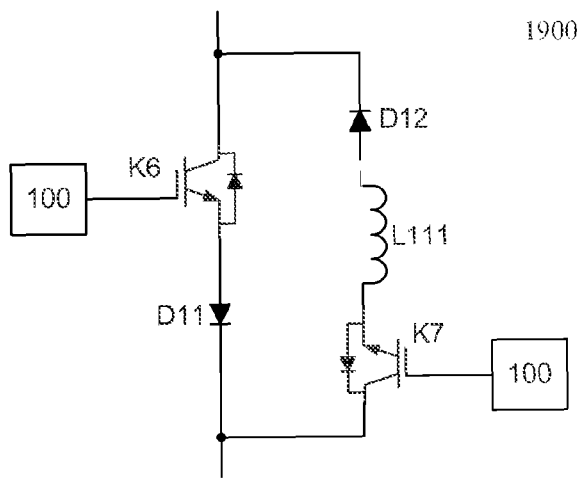

FIG. 19 illustrates an exemplary bidirectional switchgear 1900 in accordance with an exemplary embodiment of the disclosure. As shown in FIG. 19, the bidirectional switchgear 1900 may comprise a first unidirectional branch comprising the switch K6 and the unidirectional semiconductor element D11 and a second unidirectional branch comprising the unidirectional semiconductor element D12 and the current storage element L111, as described in FIG. 18. The bidirectional switchgear 1900 may further comprise a switch K7 coupled in series with the unidirectional semiconductor element D12 and the current storage element L111 in the second unidirectional branch. The heating circuit control module 100 may also be coupled with the switch K7 to disconnect or connect the second unidirectional branch. In this manner, the bidirectional switchgear 1900 may control the current flow in both directions.

The bidirectional switchgear 1 shown in FIG. 7 may be the bidirectional switchgear 1800 or the bidirectional switchgear 1900. Referring back to FIG. 7, in operation, when the in-vehicle battery feeds to be heated, the heating circuit control module 100 may control the bidirectional switchgear 1 to on state. The in-vehicle battery 5 may charge the charge storage element C1. Current may flow from the in-vehicle battery 5 to the charge storage element C1 in a direction, such as forward direction. When current reaches peak value and falls to zero, the charge storage element C1 may discharge. The current then flows back from the charge storage element C1 to the in-vehicle battery 5 in a reverse direction. The current in both forward and reverse directions may flow through the damping element R1 thereby increasing temperature of the damping element R1. The in-vehicle battery 5 may then be heated by the heat of the damping element R1. When temperature of the in-vehicle battery 5 reaches a pre-set temperature, the heating circuit control module 100 may turn the bidirectional switchgear 1 to off state to terminate operation of the heating circuit 11.

Figure 20:
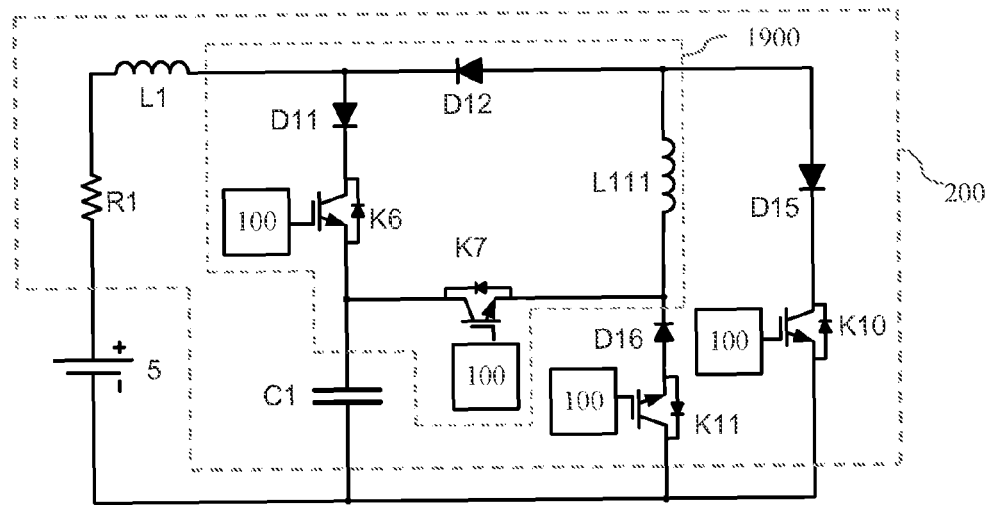
FIG. 20 is a schematic diagram of an exemplary heating circuit in an electric vehicle running control system in accordance with exemplary embodiments of the disclosure.

FIG. 20 is a schematic diagram of a heating circuit 200 in an electric vehicle running control system in accordance with exemplary embodiments of the disclosure. The heating circuit 200 may comprise the bidirectional switchgear 1900 illustrated in FIG. 19.

The heating circuit 200 may further comprise a unidirectional semiconductor element D15, a unidirectional semiconductor element D16, a switch K10, and a switch K11. The unidirectional semiconductor element D16 may be coupled between the switch K7 and the current storage element L111. The switch K11 may be coupled between the in-vehicle battery 5 and the unidirectional semiconductor element D16. One end of the unidirectional semiconductor element D15 may be coupled to a point between the unidirectional semiconductor element D12 and the current storage element L111. The other end of the unidirectional semiconductor element D15 may be coupled to one end of the switch K10. The other end of the switch K10 may be coupled to the in-vehicle battery 5. The heating circuit control module 100 may be coupled to the switch K10 and the switch K11 to control the states of the switch K10 and the switch K11. The heating circuit control module 100 may operate to turn the switch K6, the switch K7, the switch K10, and the switch K11 to open and on states.

In operation, when the in-vehicle battery 5 needs to be heated, the heating circuit control module 100 turn the switch K6 and the switch K7 to on state thereby allowing the energy to flow between the in-vehicle battery 5 and the charge storage element C1. When voltage of the charge storage element C1 is greater than a first pre-determined voltage of the in-vehicle battery 5, the heating circuit control module 100 may turn the switch K7 to off state, turn the switch K11 to on state. When current flowing through the current storage element L111 reaches zero, the switch K11 is turned to off state. The heating circuit control module 100 may turn the switch K7 and the switch K10 to on states thereby reversing the voltage polarity of the charge storage element C1.

When voltage of the charge storage element C1 is less than or equal to a second pre-determined voltage of the in-vehicle battery 5, the healing circuit control module 100 may turn the switch K7 to off state and turn the switch K11 to on state. When current flowing through the current storage element L111 reaches a first pre-determined current, the heating circuit control module 100 may turn the switch K11 to off state and turn the switch K7 and the switch K10 to on state. When the current flowing through the current storage element L111 reaches a second pre-determined current, the heating circuit control module 100 may turn the switch K10 to on state thereby allowing energy in the current storage element L111 to flow to the in-vehicle battery 5. When the current flowing through the current storage element L111 reaches zero, the heating circuit control module 100 may turn the switch K7 and the switch K10 to on state thereby reversing the voltage polarity of the charge storage element C1.

Figure 21:
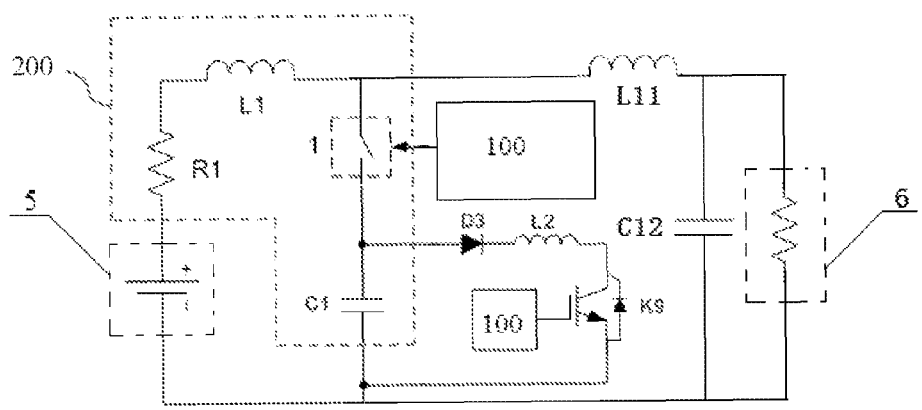
FIG. 21 is a schematic diagram of an electric vehicle running control system in accordance with exemplary embodiments of the disclosure.

FIG. 21 is a schematic diagram of an electric vehicle running control system 2100 in accordance with exemplary embodiments of the disclosure. The electric vehicle running control system 2100 may comprise the heating circuit 11, a load capacitor C12, a unidirectional semiconductor element D3, a current storage element L2, a switch K9, and a vehicle load 6.

The heating circuit 11 may be coupled with the in-vehicle battery 5. The load capacitor C12 may be coupled with the vehicle load 6 in parallel to provide energy to the vehicle load 6. The current storage element L11 may be coupled with the load capacitor C12 and the heating circuit 11 respectively. The heating circuit control module 100 may be coupled with the bidirectional switchgear 1 to control the heating circuit 11 to connect with or disconnect from the in-vehicle battery 5. The unidirectional semiconductor element D3, the current storage element L2 and the switch K9 may form a polarity reversing unit. The heating circuit control module 100 may control the switch K9 to on and off states.

Figure 22:
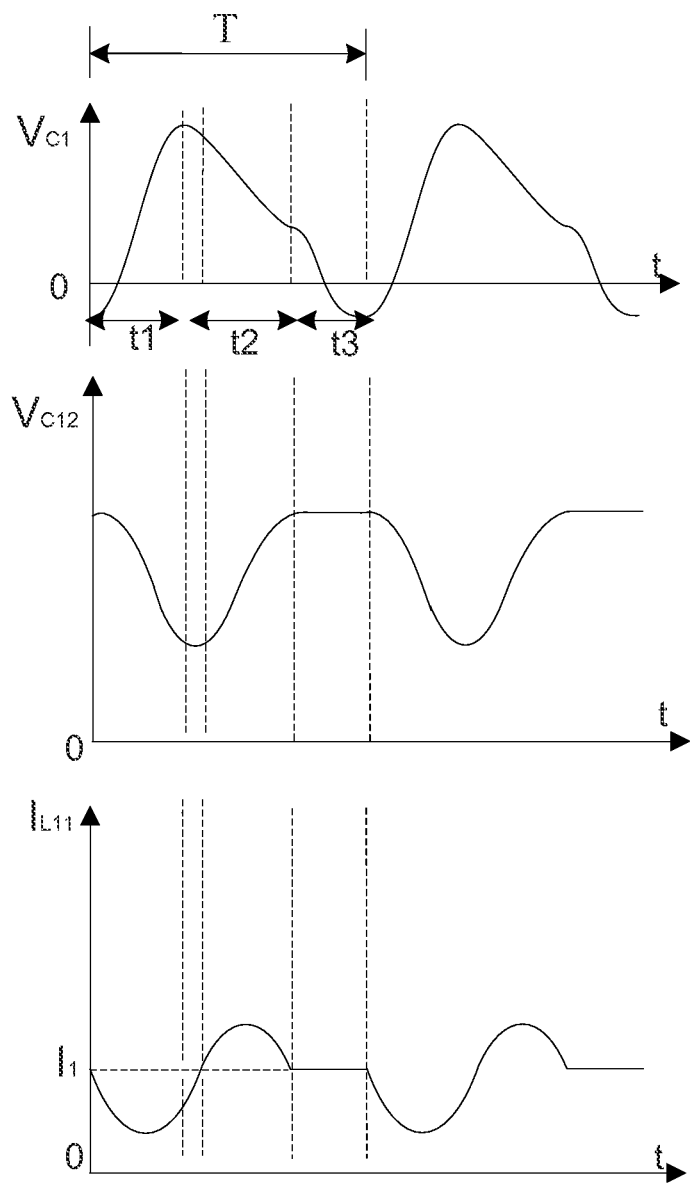
FIG. 22 shows schematic waveform of a heating circuit and a load capacitor in accordance with exemplary embodiments of the disclosure.

FIG. 22 shows schematic waveform of the heating circuit 11 and the load capacitor C12 in FIG. 21 in accordance with exemplary embodiments of the disclosure.

With references to FIGS. 21 and 22, $V_{C1}$ is the voltage of the charge storage element C1. $V_{C12}$ is the voltage of the load capacitor C12. $I_{L11}$ is the current that flows into the current storage element L11. $I_1$ is the current that flows between the load capacitor C12 and the vehicle load 6.

In operation, a working period T may comprise period t1, period t2, and period t3. During period t1, when the in-vehicle battery 5 needs to be heated, the heating circuit control module 100 may turn the bidirectional switchgear 1 to on state allowing the heating circuit 11 connecting with the in-vehicle battery 5. The in-vehicle battery 5 may discharge through the heating circuit 11 to charge the charge storage element C1. The voltage $V_{C2}$ of the charge storage element C1 may rise. The in-vehicle battery 5 may also charge the load capacitor C12 through the current storage element L11 to provide energy for the vehicle load 6 to work. When current $I_{L11}$ is less than current $I_1$, voltage $V_{C12}$ may fall.

During period t2, when current in the heating circuit 11 reaches zero, the charge storage element C1 may charge the in-vehicle battery 5. Voltage $V_{C1}$ of the charge storage element C1 may fall. The charge storage element C1 may also charge the load capacitor C12 through the current storage element L11 to provide energy for the vehicle load 6 to work. When current $I_{L11}$ is greater than the current $I_1$, voltage $V_{C12}$ of the load capacitor C12 may rise.

During period t3, when the charge storage element C1 discharges to the lowest voltage, the heating circuit control module 11 may turn the bidirectional switchgear 1 to off state to disconnect the heating circuit 11 from the in-vehicle battery 5. The heating circuit control module 100 may turn the switch K9 to on state to enable the polarity reversing unit to work. In this way, the charge storage element C1 may discharge thereby reversing the voltage polarity. At this time, voltage $V_{C1}$ may fall and reach a negative value. The heating circuit control module 100 may turn the switch K9 to off state. At this time, as the load capacitor C12 provides energy for the vehicle load 6 to work, current $I_{L11}$ may be equal to current $I_1$. Voltage $V_{C12}$ of the load capacitor C12 may be constant.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. An electric vehicle running control system, comprising:
   a heating circuit coupled with an in-vehicle battery and configured to heat the in-vehicle battery;
   a load capacitor, wherein one end of the load capacitor is coupled with one end of the heating circuit; and
   a first current storage element, wherein one end of the first current storage element is coupled with the other end of the load capacitor, the other end of the first current storage element is coupled with the other end of the heating circuit, and the first current storage element is configured to reduce interference between the heating circuit and the load capacitor,
   wherein the heating circuit comprises a damping element, a bidirectional switchgear, a second current storage element and a first charge storage element, and
   wherein the damping element and the second current storage element are connected in series to form a first circuit, the bidirectional switchgear and the first charge storage element are connected in series to form a second circuit, one end of the first circuit is connected with one end of the in-vehicle battery, the other end of the first circuit is connected with one end of the second circuit and one end of the first current storage element respectively, the other end of the second circuit is connected with the load capacitor and the other end of the in-vehicle battery.

2. The electric vehicle running control system according to claim 1, further comprising a heating circuit control module configured to control the heating circuit to connect with or disconnect from the in-vehicle battery by turning the bidirectional switchgear to on state or off state.

3. The electric vehicle running control system according to claim 1, wherein the damping element comprises an internal parasitic resistor of the in-vehicle battery, and the second current storage element comprises an internal parasitic inductor of the in-vehicle battery.

4. The electric vehicle running control system according to claim 1, wherein the damping element comprises a resistor, each of the first current storage element and the second current storage element comprises an inductor, and the first charge storage element comprises a capacitor.

5. The electric vehicle running control system according to claim 1, wherein the heating circuit further comprises an energy summing unit configured to sum energy in the heating circuit and energy in the in-vehicle battery after the bidirectional switchgear is turned to off state, and the energy summing unit comprises a polarity reversing unit configured to reverse a voltage polarity of the first charge storage element after the bidirectional switchgear is turned to off state.

6. The electric vehicle running control system according to claim 1, wherein the heating circuit further comprises an energy transferring unit configured to transfer energy in the heating circuit to an energy storage element after the bidirectional switchgear is turned to off state, and wherein the energy transferring unit comprises an electric power recharging unit configured to transfer the energy in the heating circuit to the energy storage element after the bidirectional switchgear is turned to off state.

7. The electric vehicle running control system according to claim 1, wherein the heating circuit further comprises an energy summing and transferring unit configured to transfer part of energy in the heating circuit to an energy storage element after the bidirectional switchgear is turned to off state, and sum remaining energy in the heating circuit and energy in the in-vehicle battery.

8. The electric vehicle running control system according to claim 7, wherein the energy summing and transferring unit comprises an energy summing unit and an energy transferring unit,
   wherein the energy transferring unit is configured to transfer part of the energy in the heating circuit to the energy storage element after the bidirectional switchgear is turned to off state,
   the energy summing unit is configured to sum the remaining energy in the heating circuit and the energy in the in-vehicle battery after part of the energy is transferred by the energy transferring unit.

9. The electric vehicle running control system according to claim 7, wherein
   the polarity reversing unit comprises a first single-pole double-throw switch coupled with ends of the first charge storage element respectively, and a second single-pole double-throw switch coupled with ends of the first charge storage element respectively,
   a lead-in wire of the first single-pole double-throw switch coupled with the heating circuit, a first lead-out wire of the first single-pole double-throw switch coupled with a first pole plate of the first charge storage element, a second lead-out wire of the first single-pole double-throw switch coupled with a second pole plate of the first charge storage element,
   a lead-in wire of the second single-pole double-throw switch coupled with the heating circuit, a first lead-out wire of the second single-pole double-throw switch coupled with the second pole plate of the first charge storage element, a second lead-out wire of the second single-pole double-throw switch coupled with the first pole plate of the first charge storage element, and
   the heating circuit control module coupled with the first single-pole double-throw switch and the second single-pole double-throw switch respectively, wherein the heating circuit control module is configured to reverse the voltage polarity of the first charge storage element.

10. The electric vehicle running control system according to claim 7, wherein the polarity reversing unit comprises:
    a third current storage element;
    a first switch coupled with the first charge storage element and the third current storage element in series, the heating circuit control module coupled with the first switch configured to reverse the voltage polarity of the first charge storage element by turning the first switch to on state; and
    a first unidirectional semiconductor element, wherein the first unidirectional semiconductor element is coupled between the first charge storage element and the third current storage element or between the third current storage element and the first switch.

11. The electric vehicle running control system according to claim 7, wherein the polarity reversing unit comprises:
    a second charge storage element; and
    a first DC-DC module, the heating circuit control module coupled with the first DC-DC module to transfer energy in the first charge storage element to the second charge storage element, and transfer energy in the second charge storage element to the first charge storage element.

12. The electric vehicle running control system according to claim 11, wherein the electric power recharging unit comprises a second DC-DC module and the heating circuit control module is coupled with the second DC-DC module configured to transfer energy in the first charge storage element to the in-vehicle battery.

13. The electric vehicle running control system according to claim 12, wherein the energy summing and transferring unit comprises a third DC-DC module, and the heating circuit control module is connected with the third DC-DC module configured to transfer part energy in the first charge storage element to the energy storage element, and sum remaining energy in the first charge storage element and the energy in the in-vehicle battery.

14. The electric vehicle running control system according to claim 13, further comprising:
    an energy limiting circuit configured to limit current flowing between the heating circuit and the in-vehicle battery.

15. The electric vehicle running control system according to claim 14, wherein
    the bidirectional switchgear comprises a first unidirectional branch and a second unidirectional branch to control energy flow between the in-vehicle battery and the heating circuit, and
    wherein the heating circuit control module is coupled with one of the first unidirectional branch and the second unidirectional branch.

16. The electric vehicle running control system according to claim 15, wherein the energy limiting circuit comprises a fourth current storage element in the second unidirectional branch.

17. The electric vehicle running control system according to claim 16, wherein the first unidirectional branch comprises a second switch coupled in series with a second unidirectional semiconductor element and the second unidirectional branch comprises a third unidirectional semiconductor element, and wherein the heating circuit control module coupled with the second switch is configured to control on and off states of the second switch, and the fourth current storage element is connected with the third unidirectional semiconductor element in series.

18. The electric vehicle running control system according to claim 17, wherein the second unidirectional branch further comprises a third switch coupled with the third unidirectional semiconductor element, wherein the heating circuit control module is connected with the third switch configured to control the second unidirectional branch.

19. An electric vehicle running control system, comprising:
    a first current storage element;
    a heating circuit coupled with an in-vehicle battery and configured to heat the in-vehicle battery, the heating circuit comprising a switch coupled in series with a first unidirectional semiconductor element and a second unidirectional semiconductor element coupled with a second current storage element in series; and
    a load capacitor,
    wherein one end of the load capacitor is coupled with one end of the heating circuit,
    wherein one end of the first current storage element is coupled with the other end of the load capacitor, the other end of the first current storage element is coupled with the other end of the heating circuit, and the first current storage element is configured to reduce interference between the heating circuit and the load capacitor,
    wherein the heating circuit comprises a damping element, a bidirectional switchgear, a second current storage element and a first charge storage element, and wherein the damping element and the second current storage element are connected in series to form a first circuit, the bidirectional switchgear and the first charge storage element are connected in series to form a second circuit, one end of the first circuit is connected with one end of the in-vehicle battery, the other end of the first circuit is connected with one end of the second circuit and one end of the first current storage element respectively, the other end of the second circuit is connected with the load capacitor and the other end of the in-vehicle battery.

* * * * *

UNITED STATES PATENT AND TRADEMARK OFFICE
CERTIFICATE OF CORRECTION

| | |
|---|---|
| PATENT NO. | : 9,263,778 B2 |
| APPLICATION NO. | : 14/335831 |
| DATED | : February 16, 2016 |
| INVENTOR(S) | : Yaochuan Han et al. |

It is certified that error appears in the above-identified patent and that said Letters Patent is hereby corrected as shown below:

On the Title Page

At (30), insert --(30)    Foreign Application Priority Data

Jan. 18, 2012    (CN) ................................ 2012 1 0015386.4--

Signed and Sealed this
Nineteenth Day of July, 2016

Michelle K. Lee
*Director of the United States Patent and Trademark Office*